United States Patent Office 3,598,858
Patented Aug. 10, 1971

3,598,858
PGE₂ AND PGE₃
Sune Bergstrom, 12 Danderydsgatan, and Jan Sjøvall, Kemiska Institutionem, Karolinska Institutet, both of Stockholm, Sweden
No Drawing. Continuation-in-part of applications Ser. No. 738,514, May 28, 1958, and Ser. No. 199,209, Apr. 9, 1962. This application June 20, 1962, Ser. No. 203,752
Claims priority, application Great Britain, Mar. 29, 1962, 12,139/62
Int. Cl. C07c 69/74
U.S. Cl. 260—468
2 Claims

ABSTRACT OF THE DISCLOSURE $PGE_2$, $PGE_3$, their salts and esters, free of antigens and pyrogens. PGE type compounds exhibit blood pressure lowering and smooth muscle stimulating properties.

This invention relates to compositions of matter and to processes for the production thereof. More particularly this invention is concerned with new compounds dihydro-PGE, dihydro-PGF, epi-PGF, dihydro-epi-PGF, bisdehydro-PGE, bisdehydro-PGF, bisdehydro-epi-PGF, tetradehydro-PGE, tetradehydro-PGF, and tetradehydroepi-PGF, their esters and salts, to related polyols and their esters, and to processes for the preparation of these compounds.

This is a continuation-in-part of our applications No. 738,514 filed May 28, 1958, now Pat. No. 3,069,322, and 199,209 filed Apr. 9, 1962 now abandoned.

These new and useful compounds have pharmacodynamic activity. PGE type are active both in stimulating smooth muscle tissue and in lowering blood pressure. PGF types are active also instimulating smooth muscle tissue but have no effect on blood pressure.

Crude products obtained from accesory genital glands, sperm, and the like have heretofore been noted to have pharmacodynamic effects such as hyper- or hypotensive activity, and smooth muscle-stimulating activity. Thus hypertensive activity was noted by Japelli and Scopa in 1906 (Arch. Ital. Biol. 45,165) in an extract of dog prostate glands, hypotensive activity and smooth muscle stimulating activity were noted by Kurzrok in 1931 (Proc. Soc. Exp. Biol. N.Y. 28,268). Goldblatt in 1933 (Chem. E. Ind. 52, 1056), and von Euler in 1931–6 (Arch. Exp. Path. Pharmak. 175, 78 (1934), 181 (1936), J. Physiol. 72, 74 (1931), 81, 102 (1934), 84,210 (1935), 88,213 (1936), Klin. Wschr. 14, 1182 (1935). A crude material, designated prostaglandin, having hypotensive activity and smooth muscle-stimulating activity was reported by von Euler.

More recently as described in our parent application and in Acta Chemica Scandinavia 14, 1693–1705, (1960), two distinct compounds designated PGE and PGF (also referred to as $PGE_1$ and $PGF_1$) have been isolated in essentially pure crystalline form from crude materials such as von Euler prostaglandin, or directly from accessory genital materials such as prostate glands and sperm. The same or related compounds are also found in other animal tissues and secretions. These compounds are associated in the source materials and in crude extracts thereof with antigens and pyrogens, for example, tissue fragments, lipids, cellular debris, foreign proteins, and the like, and are not useful for parenteral applications. The isolation of these compounds free of antigens and pyrogens made it possible to utilize their pharmacodynamic effects without undesirable side effects or reactions.

We have now found that other PGE and PGF type compounds can be isolated as single entities free of antigens and pyrogens, from a variety of animal tissue and secretions. We have found also that PGE and PGF type compounds can be obtained by hydrogenation of PGE and PGF and by chemical reduction of PGE with sodium borohydride. We have also found that the new PGE and PGF type compounds isolated from tissues or secretions can be hydrogenated and chemically reduced to give corresponding products. By PGE and PGF type compounds we mean compounds which are related to PGE and PGF both chemically and pharmacodynamically. PGE type compounds, for example, are active both in stimulating smooth muscle tissue and lowering blood pressure and have a chemical structure similar to that of PGE whereas the PGF type compounds are active in stimulating smooth muscle tissue but have no effect on the blood pressure and have a chemical structure similar to that of PGF.

PGE has been determined to have the following structural formula:

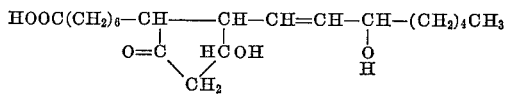

7-[3-hydroxy-2-(3-hydroxy-1-octenyl)-5-oxocyclopentyl]-heptanoic acid and PGF the following formula:

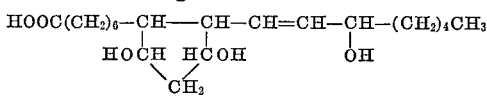

7-[3,5-dihydroxy-2-(3-hydroxy-1-octenyl)cyclopentyl]-heptanoic acid.

Reduction of PGE with sodium borohydride gives PGF, concomitantly with the epimer, ep-PGF (also known as $PGF_2$) which has the same type of activity as PGF. In PGF the hydroxyl groups in the cyclopentane nucleus are oriented on the same side of the plane and are designated as α-hydroxy groups. In epi-PGF the orientation of the hydroxyl group obtained from the oxo group is β. The orientation of the double bond in PGF, PGE and epi-PGF is trans, that of the heptanoic acid side chain is α, and that of the 3-hydroxy-1-octenyl side chain is β. The absolute configuration of the 3-hydroxy group in the side chain is D. We have also found that PGE, PGF, and epi-PGF, can be hydrogenated to the corresponding saturated acids, dihydro-PGE, 7 - [3-hydroxy-2-(3-hydroxyoctyl)-5-oxocyclopentyl]-heptanoic acid; dihydro-PGF, 7-[3α,5,α-dihydroxy-2-(3-hydroxyoctyl) cyclopentyl]-heptanoic acid; and dihydro-epi-PGF, 7-[3α,5β-dihydroxy-2-(3-hydroxyoctyl)-cyclopentyl]-heptanoic acid, without loss of the typical PGE and PGF type of activity.

On fractionation of crude PGE fractions we have obtained two additional components having the pharmacodynamic activity associated with PGE and a similar structure. The first of these is bisdehydro-PGE ($PGE_2$) which has the following structural formula:

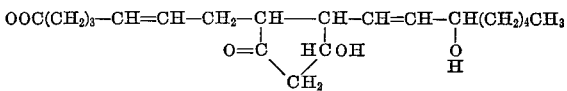

7-[3-hydroxy-2-(3-hydroxy-1-octenyl)-5-oxocyclopentyl]-5-heptanoic acid.

The second is tetradehydro-PGE (PGE₃) which has the following formula:

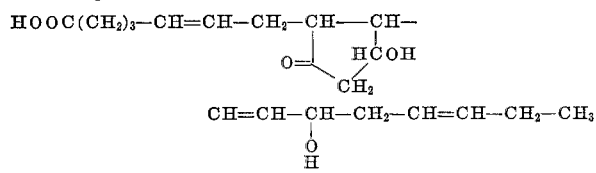

7-[3-hydroxy-2-(3-hydroxy-1,5-octadienyl)-5-oxocyclopentyl]-5-heptenoic acid

These compounds have the same configuration as PGE and on catalytic hydrogenation both yield dihydro-PGE. On chemical reduction with borohydride the 5-oxo group is reduced to hydroxy and two compounds for each dehydro-PGE are obtained according to the orientation of the 5-hydroxy group, bis-dehydro-PGF (5α-hydroxy), bis-dehydro-epi-PGF (5β-hydroxy), tetradehydro-PGF (5α-hydroxy) and tetradehydro-epi-PGF (5β-hydroxy), each of these compounds has the typical PGF activity. On catalytic hydrogenation of these compounds there is obtained dihydro-PGF and dihydro-epi-PGF.

On reaction with bases and carboxyl-esterifying agents the corresponding carboxylates (salts and esters) are obtained. Carboxylates exhibit the same activity as the free acids and can be used for the same purposes. Thus, the acids of the invention can be utilized in the free acid form or in the form of an ester or a pharmacologically acceptable salt, for example, a hydrocarbyl ester in which the hydrocarbyl group contains not more than 13 carbon atoms, or a salt of an alkali metal or alkaline earth base, for example, sodium, potassium, lithium, calcium, barium, strontium, and magnesium or of ammonia or a basic amine such as mono-, di-, and triethylamines, mono-, di-, and tripropylamines (iso and normal), ethyldimethylamine, benzyldiethylamine, cyclohexylamine, benzylamine, dibenzylamine, N,N-dibenzylethylene diamine, N-methyl bis-ortho-methoxy-phenylisopropylamine, methoxy-phenylisopropylamine, and like lower-aliphatic, lower-cycloaliphatic, and lower-araliphatic amines up to and including about eighteen carbon atoms; heterocyclic amines such as piperidine, morpholine, pyrrolidine, piperazine, and the loweralkyl derivatives thereof, such as, 1-methylpiperidine, 4-ethylmorpholine, 1-isopropylpyrrolidine, 1,4-dimethylpiperazine, 1-n-butylpiperidine, 2-methylpiperidine, 1-ethyl-2-methyl-piperidine; as well as amines containing water-solubilizing or hydrophilic groups such as mono-, di-, and triethanolamines, ethyldiethanolamine, n-butylmonoethanolamine, 2-amino-1-butanol, 2-amino-2-ethyl-1,3-propanediol, 2-amino-2-methyl-1-propanol, tris(hydroxymethyl)aminomethane, phenylmonoethanolamine, p-tertiaryamylphenyldiethanol amine, and galactamine, N-methyl glucamine, N-methyl glucosamine, ephedrine, phenylephrine, epinephrine, and procaine, and can also be used in the form of their carboxylate esters for example the methyl, ethyl, 2-ethylhexyl, cyclohexyl, cyclohexylmethyl, benzyl, benzhydryl, and like hydrocarbyl esters containing not more than 13 carbon atoms. These esters can be formed by the usual methods, for example, by reaction with diazomethane or other appropriate diazohydrocarbons.

Novel compounds according to the invention are also obtained by chemical reduction of PGE or PGF, or the other PGE and PGF type compounds described above, with lithium aluminum hydride. On chemical reduction with lithium aluminum hydride, PGF gives PGF tetraol, 7-[3α,5α-dihydroxy-2-(3 - hydroxy-1-octenyl) cyclopentyl]-heptan-1-ol; epi-PGF gives epi-PGF tetraol, 7-[3α,5β-dihydroxy-2-(3-hydroxy - 1 - octenyl)-cyclopentyl]-heptan-1-ol; dihydro-PGF gives dehydro PGF tetraol, 7-[3α,5α-dihydroxy - 2 - (3-hydroxyoctyl)cyclopentyl]-heptan-1-ol; dihydro-epi-PGF gives dihydro-epi-PGF tetraol, 7-[3α,5β-dihydroxy - 2 - (3-hydroxyoctyl)cyclopentyl]-heptan-1-ol; bisdehydro-PGF gives bisdehydro-PGF tetraol, 7-[3α,5α - dihydroxy-2-(3-hydroxy-1-octenyl)-cyclopentyl]-5-hepten-1-ol; bisdehydro-epi-PGF gives bisdehydro-epi-PGF tetraol, 7-[3α,5β-dihydroxy-2-(3-hydroxy-1-octenyl)-cyclopentyl] - 5-hepten-1-ol; tetradehydro-PGF gives tetradehydro-PGF tetraol, 7-[3α,5α-dihydroxy-2-(3-hydroxy-1,5-octadienyl)-cyclopentyl]-5-hepten-1-ol; tetradehydro-epi-PGF gives tetradehydro-epi-PGF tetraol, 7-[3α,5β-dihydroxy-2-(3 - hydroxy-1,5-octadientyl)-cyclopentyl]-5-hepten-1-ol. The PGF type alcohols are useful as smooth muscle stimulants and in modifying glycerolphthalate and other alkyd resins in the like manner as pentaerythritol, as fixatives for perfume as emulsifying agents, as humectants, and as plasticizers for vinyl resins. They can be converted to esters by treatment with acrylating agents such as acid anhydrides and acid halides. The PGE and PGF type compounds can also be esterified in the same way. The esters are useful as plasticizers for vinyl resins and for up-grading the crude alcohols and acids. Thus, crude PGF type alcohols and crude PGE and PGF type acids can be esterified, the ester purified, and the PGF type alcohol, or PGE or PGF acid regenerated by acid, alkaline, or enzymatic hydrolysis.

The esters just described, that is, the acylated compounds as distinguished from the carboxylate esters are obtained in the usual way that alcohols are esterified. Thus, the PGF type tetraols or the PGE and PGF type acids can be reacted with the appropriate acid anhydride or acid halide, for example, those of acetic, propionic, butyric isobutyric, enanthylic, valeric, isovaleric, caproic, caprylic and like lower alkanoic acids. The reaction advantageously is carried out in the presence of an acid binding agent, for example, pyridine and trimethylamine, with or without an inert solvent, for example dioxane and methylene chloride. The temperature advantageously is kept low, for example, between about 10° and about 40° C.

Since the PGE and PGF type compounds generally contain either a β-hydroxycyclopentanone grouping or an allyl alcohol grouping or both, they are exceptionally sensitive to both low and high pH and must be isolated from natural sources using mild and gentle techniques compatible with these sensitive groups. They can be extracted from a variety of naturally occurring animal material particularly those rich in lipids, such as, lung, liver, kidney, duodenum, bone marrow, spinal cord, fish meal, and chicken offal, as well as from sperm and prostate, obtained from a variety of animals such as fish, birds, and mammals, for example, chickens, pigs, sheep, cattle, and man. While previous workers have obtained biologically active materials from some of these natural sources, they have not heretofore succeeded in isolating such materials in essentially pure form free of pyrogens and antigens associated with tissue fragments or cell debris, lipids, foreign protein and the like. Consequently such materials have not been suitable for repeated paranteral administration.

In accordance with our invention we effect isolation of the PGE and PGF type compounds by extraction, concentration, fractionation, etc. under mild and buffered conditions avoiding extremes of pH and temperature. Advantage is taken of hydrophilic and lipophilic solvents and aqueous buffer solutions to effect isolation and purification of the crude acids and advantage is taken of differences in polarity due to the added hydroxyl group in PGF types and the greater unsaturation in the bisdehydro- and the tetradehydro-PGE and bisdehydro-PGF types, e.g., bisdehydro-PGF>PGF>tetradehydro-PGE>bisdehydro-PGE>PGE. Thus by fractional liquid-liquid extraction techniques such as countercurrent distribution or partition chromatography, homogeneous or single entities can be isolated from the crude extracts.

A preferred process involves extracting the crude material containing the active components to separate the active components from the cellular debris, tissue, and as much of the insoluble inert materials as possible, separating the acid components from the extract by contact with a material having affinity for acids, for example, aqueous buffer solutions or anion exchange resins, fractionating the crude acids by multi-stages of reverse phase, partition chromatography in which the first stage is heavily loaded so that the active acids are separated as a group from the inactive acids and the later stages are lightly loaded whereby the active acids are fractionated into separate components.

The extraction of the crude material is advantageously carried out in two steps in which the crude material is first extracted with water-miscible alkanols, for example methanol, ethanol, isopropanol, and the extracted material then transferred to a water-immiscible lipophilic solvent. This is accomplished by concentrating the alkanol to an essentially aqueous slurry and extracting the aqueous solution that is obtained with the water-immiscible lipophilic solvent. Suitable water-immiscible lipophilic solvents for this purpose include chlorinated hydrocarbons, for example, methylene chloride, chloroform, and ethylene dichloride; lower fatty acid esters, for example, ethyl acetate, and amyl acetate; the higher alkanols, for example, the water-immiscible butanols, the pentanols, the hexanols and the octanols; the water-immiscible lower alkanones, for example, methyl isobutyl ketone; ethers, for example, dimethyl ether, diethyl ether, methyl isobutyl ether; aromatic hydrocarbons, for example, benzene and toluene; and the like. If desired the crude material can be extracted directly with the water-immiscible lipophilic solvents but this is less preferred because the lower alkanols tend to denature and thus precipitate soluble proteins and are less likely to take up non-polar materials.

The crude extracts thus obtained are then treated to isolate the carboxylic acids. Generally pharmacologically undesirable fats, fatty acids, and other impurities contaminate these crude extracts. These contaminants are removed by one or more partitions between a lipophilic phase, such as the solutions in lipophilic solvents resulting from the extracting step, and buffered aqueous alkaline phases, for example, aqueous solutions of phosphate, bicarbonate, and tris-(hydroxymethylamino) methane. Any aqueous solution buffered at about pH 8–9 can be used. The lipophilic stage is extracted with the buffered aqueous phase, the buffered aqueous phase is then acidified to a pH of about 3–4, and redistribution is effected into the same or different lipophilic solvent. By suitable selection of the buffer pH and the lipophilic solvent, effective partition coefficients are obtained. The partition between the buffer phase and the lipophilic phase can be effected by countercurrent distribution if desired. With sufficient transfers, particularly with the less polar lipophilic solvents, for example, ether, and the lower pH, for example about pH 8, and the PGE type acids concentrate more in the lipophilic phase while the PGF type acids concentrate in the buffer phase. It is not necessary and usually not desirable, however, to effect separation of the PGE and PGF types at this stage, but simply to extract all the active acid components into the final buffer phase then transfer them to a volatile solvent, for example, ether, from which the crude acids can be recovered by evaporation in vacuo.

The progress of the active materials from one fraction to another can be followed by quantitative in vitro assays of muscle stimulating properties according to von Euler, Archiv fur Physiologie 77, 96–99 (1937). The total fatty acid concentration can be followed by microtitration with dilute alkali and the PGE type acids (cyclopentanones) are readily followed and distinguished from the PGF type acids (cyclopentanols) by the characteristic carbonyl absorption in the infrared near 1730 cm.$^{-1}$ and by development of ultraviolet absorption near 280 mu with alkali.

Alternatively, the active acids can be recovered from the crude extracts by adsorption on and elution from anion exchange resins. In this case the transfer to a water-immiscible solvent can advantageously be omitted; and the water-miscible alkanol extract loaded directly on the ion-exchange column. Suitable anion exchange resins are obtained by chloromethylating by the procedure given on pages 88 and 97 of Kunin, Ion Exchange Resins, John Wiley and Sons, Inc., a polystyrene resins, cross-linked if desired with divinyl benzene, prepared by the procedure given on page 97 Kunin. Ion exchange resins of this type are marketed under the names of Dowex 1 and Dowex 2, Dowex 3, Dowex 21K, Ionac A–300, Amberlites IRA–400 and IRA 401, Amberlite JR–45, Duolite A–102, and Duolites A–2, A–4, A–6. The adsorbed acids can be eluted with solvents for the acids, for example, those solvents listed above, acidified to pH of 3–4 with hydrochloric acid or with ammonium chloride. Aqueous solutions of water-miscible alkanols and ammonium chloride, for example, a 50 percent solution of ammonium chloride in 70 percent aqueous methanol can be effectively used.

The crude acids recovered from the crude extracts by one or the other procedure are then fractionated by multistage, reverse phase, partition chromatography. If desired a transfer from a highly non-polar solvent, for example, petroleum ether or like hydrocarbon solvent, to a hydrophilic solvent, advantageously an aqueous solution of a water-miscible alkanol, can be interposed to effect separation of the more non-polar impurities. On extraction of the non-polar solvent solution with aqueous alcoholic solution, the more highly non-polar components stay in the non-polar solvent. In the multistage, reverse phase, partition chromatography, the column in the first stage is loaded heavily in order to effect a rough separation of the desired active acids from the more and less polar components. The later stages are charged with the actve fraction from the preceding stage but with a substantially lower loading than used in the final stage so that more effective separation into the component acids is obtained. The loading in the first stage can range from about 50 to about 500 mg. of crude acid per gram of support whereas the loading in the later stages should be less than about 25 mg. of acid per gram of support. Suitable supports for the partition columns are hydrophobic diatomite, (kieselguhr treated with chloromethylsilane) or finely divided, low-temperature polyethylene. The latter is advantageously used in the first stage. Any of the diatomacous earths used as filter aids can be utilized by treating them with chloromethylsilane to render them hydrophobic. The high flow types, as exemplified by Hyflo Supercel, can be used advantageously. If desired the intermediate fractions can be treated to crystallize out the PGE before further fractionation. The stationary phase for the partition column is a lipophilic water-immiscible solvent and the mobile phase is a hydrophylic solvent. Thus, the hydrophobic support has affinity for the stationary phase but not for the mobile phase. Consequently, the more polar components are concentrated in the mobile phase and the less polar ones in the stationary phase. Any combination of lipophilic and hydrophilic phases can be used for this purpose. Their efficiency, however, will depend upon the partition coefficient. We have found that effective separation is obtained when the mobile phase is a solution of a water-miscible alkanol in water in about equal proportions, say btween 3:5 to 5:3. Any immiscible lipophilic solvent can be used for the stationary phase but advantageously a mixture of relatively polar and non-polar solvents are employed, for example, a mixture of water-immiscible alkanols or alkanones or lower fatty acid esters with hydrocarbon or chlorinated hydrocarbon solvents. The two types of immiscible lipophilic solvents also should be in approximately equal proportions, say between 3:5 to 5:3. The mobile solvents and the stationary solvents are mixed and equilibrated to form the two phases. The stationary phase is then put on the column and the column is loaded with the charge, preferably dissolved or mixed with a small amount of one of the phases, preferably the mobile phase. The column is then eluted with the mobile phase.

By using a solvent system made up of a water-miscible alkanol and water in the proportions of 9:10 to 10:9 and a water-immiscible alkanol and chloroform in the proportions of 9:10 to 10:9 effective separation of the PGE type acids can be obtained in two stages of reverse phase, partition chromatography under the conditions of loading described above. On eluting the columns the progress of the components is followed by in vitro assays, microtitrations, paper chromatography or other assays and the desired fractions are pooled either for further processing or for recovery of the component fractionated.

The pharmacologically active acids of the invention can be used as medicaments, for example, in the form of pharmaceutical preparations, which contain the compound or a salt or a carboxylate ester thereof in admixture with a pharmaceutical organic or inorganic carrier suitable for enteral, parenteral or topical administration. For making such carriers there are used substances which do not react with the new compounds, for example, water, gelatin, lactose, starches, magnesium stearate, talc, vegetable oils, benzyl alcohols, gums polyalkylene glycols, petroleum jelly, cholesterol or other known carriers for medicaments. The pharmaceutical preparations may be made up, for example, in the form of tablets, capsules, pills, suppositories, bougies or in liquid form as solutions, suspensions, or emulsions. If desired, they may be sterilized and/or may contain auxiliary substances, such as preserving agents, stabilizing agents, wetting or emulsifying agents, salts for regulating the osmotic pressure of buffers. They may also contain other therapeutically valuable substances, for example, anti-bacterials and diuretics.

The following examples are illustrative of the process and products of the present invention, but are not to be construed as limiting. All percentages and proportions are as volume per volume unless otherwise noted.

EXAMPLE 1

(A) Extraction

Freeze-dried sheep prostate glands were minced in a meat-grinder. The dry glands were suspended in distilled water, using four liters per kilogram of dried glands. After fifteen minutes, twelve liters of 95 percent ethanol were added. The minced glands were stirred mechanically for about one hour, and then left to sediment over night. The supernatant, clear ethanol solution, was decanted, and the insoluble residue was strained through cheesecloth and filtered. The supernatant and filtrate were combined and evaporated in vacuo to about 1/20 the original volume, i.e., to about three liters. This crude extract was itself extracted with about three liters of ether. The water phase was then acidified to pH 3.5 and extracted again with three liters of ether and then twice with 1.5 liters of ether. The combined ether extracts were extracted six times with ¼ volume or about 2.25 liters of 0.2 molar phosphate buffer of pH 8. During the first extraction, the pH of the buffer had to be adjusted back to pH 8 with two normal sodium carbonate. The combined buffer phases were acidified to pH 3 with 6 normal hydrochloric acid and extracted with 1 volume, i.e., about 13.5 liters of ether, then extracted three additional times each with seven liters of ether. The ether extracts were combined and washed until free of chloride ions with small portions of water, each water portion being passed through a second ether phase. The ether was evaporated in vacuo, leaving a solid residue.

(B) Countercurrent distribution

The residue was subjected to a five stage countercurrent distribution between equal volumes of ether and 0.5 molar phosphate buffer at pH 6.4, 200 milliliters being used per five grams of extract. The buffer phases were acidified and extracted three times with ether. All phases were evaporated to dryness, weighed, and the physiological activity of each was determined.

| Phase number | Sample | Weight (g.) | Physiological activity-relative units | |
|---|---|---|---|---|
| | | | Pr phase | Per mg. |
| Ether: | | | | |
| 1 | a | 6.40 | 7,200 | 1 |
| 2 | b | 0.80 | 2,200 | 3 |
| 3 | c | 0.25 | 1,300 | 5 |
| 4 | d | 0.15 | 1,000 | 7 |
| 5 | e | 0.10 | 1,200 | 12 |
| Buffer: | | | | |
| 5 | f | 0.06 | 1,700 | 28 |
| 4 | g | 0.05 | 1,900 | 38 |
| 3 | h | 0.05 | 2,400 | 48 |
| 2 | i | 0.08 | 2,200 | 37 |
| 1 | j | 0.80 | 2,100 | 3 |

The physiological activity was determined on duodenal intestinal strips of rabbits in a bath of 30 milliters according to the procedure of von Euler [Archiv. fur Physiologie, 77: 96–99 (1937)].

(C) Reversed phase partition chromatography

Samples "d" through "i" which contained the bulk of the PGF were pooled and further treated to remove impurities. Samples "a" through "c" which contained the bulk of the PGE were likewise pooled and treated to remove impurities. Each pool (the PGE pool and the PGF pool) was dissolved in the mobile phase of an isooctanol: chloroform: methanol: water (1:1:10:10) system at the rate of 100 milligrams per three to five milliters of mobile phase. The column in which four milliliters of static phase (upper phase) of an isooctanol: chloroform: methanol: water (1:1:10:10) system was supported on 4.5 grams of hydrophobic diatomite (kieselguhr treated with chloromethylsilane) was charged with 100 milligrams of the pooled sample mixed with a minimum of about three to five milliliters of mobile phase, and then developed with mobile phase. The first fifty milliliters of eluates were physiologically inactive, the next 65 milliliters (about 50 to 115 milliliters) showed activity with a peak at about the sixtieth milliliter of the effluent of about 2000 von Euler units. The remainder of the effluent was inactive. An approximately five fold purification of the active compounds was obtained from this step.

The PGF and PGE concentrate, the fifty to 115 milliliter fraction, was further purified and separated by reverse phase chromatography as described above using a methanol: water: isoamyl acetate: chloroform (35:65: 4:6) solvent system.

The PGF was found in the 25 to 45 milliliter fraction and the PGE in 100 to 130 milliliter fraction. The peaks of the PGF and PGE fraction measured about 2000 Von Euler units.

(D) Crystallization and characterization

The peak fractions were relatively pure since partition (not reverse phase) chromatography of them using an ethylenechloride: heptane: acetic acid: water (15:15:6:4) solvent system yielded fractions having ideal curves, i.e. curves typical of essentially pure compounds, that gave crystals of PGE and PGF on standing at four degrees centigrade. These crystals were characterized as follows:

PGF

Crystal habitat: colorless needle-shaped.
Melting point: 102–3 degrees centigrade.
Ultraviolet absorption spectrum: acid degraded material (forty micrograms in one milliliter of concentrated sulfuric acid after 85 minutes at room temperature) shows peaks at about 308 and 465 millimicrons.

Infrared absorption spectrum: The methyl ester of PGF exhibits characteristic absorption at the following wave lengths expressed in reciprocal centimeters: 3279, 1340, 1205, 1030, 942, 2611, 1299, 1172, 1022, 825, 1700, 1272, 1114, 995, 816, 1460, 1253, 1099, 977, 765, 1406, 1235, 1074, 945, 726, 1351, 1223, 1046, 932.

Elemental analysis.—Calculated for $C_{20}H_{36}O_5$ (percent): C, 67.4; H, 10.2; O, 22.4. Found (percent): C, 67.2; H, 10.0; O, 22.6.

Interplanar spacings in angstrom units obtained by X-ray diffraction of crystalline PGF are as follows:

| d.A.: | I |
|---|---|
| 16.44 | Sharp. |
| 9.46 | Weak. |
| 8.16 | Weak. |
| 6.19 | Medium. |
| 5.46 | Medium. |
| 5.05 | Medium. |
| 4.71 | Very weak. |
| 4.63 | Very sharp. |
| 4.54 | Medium. |
| 4.46 | Medium. |
| 4.08 | Medium. |
| 4.02 | Sharp. |
| 3.74 | Weak. |
| 3.56 | Weak. |
| 3.45 | Very weak. |
| 3.07 | Very weak. |
| 2.93 | Weak. |
| 2.80 | Weak. |
| 2.67 | Very weak. |
| 2.56 | Very weak. |
| 2.48 | Very weak. |
| 2.39 | Very weak. |
| 2.34 | Very weak. |
| 2.02 | Weak. |
| 1.48 | Weak. |

PGE

Crystal habitat: Acicular orthorhombic ($P2_12_12_1$) colorless crystal.

Unit cell dimension are:
A equals 8.23, 0.04 A.
B equals 19.4, 0.1 A.
C equals 25.9, 0.1 A.

Containing eight molecules per unit cell, and having molecular weight of 353±5.

Exhibits a specific gravity by flotation in potassium bromide solution of about 1.135 grams per cubic centimeter.

Melting point 115–7 degrees centigrade.

Ultraviolet absorption spectrum: Acid degraded material (38 micrograms of crystalline PGE in one milliliter of concentrated sulfuric acid, after 85 minutes at room temperature) shows peaks at about 250, 328, and 477 millimicrons.

Infrared absorption spectrum: The methyl ester of PGE exhibits characteristic absorption at the following wave lengths expressed in reciprocal centimeters: 3333, 1364, 1109, 667, 1736, 1351, 1073, 1634, 1319, 1020, 1460, 1250, 971, 1437, 1166, 726.

Elemental analysis.—Calculated for $C_{20}H_{34}O_5$ (percent): C, 67.8; H, 9.7; O, 22.6. Found (percent): C, 66.5–67.0; H, 10.6–10.3; O, 22.9.

Interplanar spacings in angstrom units obtained by X-ray diffraction of crystalline PGE are as follows:

| d. A.: | I |
|---|---|
| 13.00 | Sharp. |
| 6.45 | Very weak. |
| 6.13 | Very weak. |
| 5.80 | Weak. |
| 5.75 | Medium. |
| 5.01 | Medium. |
| 4.26 | Very weak. |
| 4.20 | Very weak. |
| 4.14 | Very sharp. |
| 3.97 | Sharp. |
| 3.91 | Medium. |
| 3.75 | Very weak. |
| 3.48 | Weak. |
| 3.25 | Weak. |
| 3.18 | Weak. |
| 3.06 | Weak. |
| 2.87 | Very weak. |
| 2.75 | Weak. |
| 2.65 | Very weak. |
| 2.59 | Very weak. |
| 2.50 | Weak. |
| 2.44 | Very weak. |
| 2.39 | Very weak. |
| 2.38 | Very weak. |
| 2.35 | Very weak. |

The crystalline PGE is active at a concentration of $10 \times 10^{-9}$ grams per milliliter in causing a marked contraction of a duodenal strip. The crystalline PGF is active at a concentration of about $5 \times 10^{-9}$ grams per milliliter. The crystalline PGE, on injection of two to four micrograms into a 2.5 kilogram rabbit, lower the blood pressure about ten to twenty millimeters.

EXAMPLE 2

To a dry ether solution of one milligram (2.8 micromoles) of crystalline PGE was added a slight excess of diazomethane, prepared in ether from four micromoles of nitrosomethylurethane. The reaction mixture was allowed to stand for about five minutes, and the ether and excess diazomethane distilled off. On distillation to dryness there was obtained crystalline methyl ester of PGE having the characteristic infrared absorption spectrum given above.

EXAMPLE 3

Following the procedure of Example 2, substituting crystalline PGF for the crystalline PGE, there was obtained crystalline methyl ester of PGF having the characteristic infrared absorption spectrum given above.

The infrared spectra referred to above were obtained by the KBr disk method.

EXAMPLE 4

The procedure of Example 1A was repeated except that ethyl acetate was used in place of ether except in the final extraction where the ether extract was evaporated to dryness. The dried residue was then taken up in petroleum ether and extracted three times with an equal volume of 57 percent aqueous ethanol. The aqueous ethanol extract was concentrated in vacuo to remove the ethanol and the aqueous phase was extracted with ether and the ether extract was evaporated to dryness. The crude extract thus obtained was then partitioned on a partition column using 50 percent aqueous methanol as the mobile phase and a 50–50 mixture of isooctanol and chloroform as the stationary phase. The support was finely-divided, low-temperature polyethylene. Seven grams of the crude extract was put on the column with 67 ml. of stationary phase on 100 g. of the support. The column was then developed with 2200 ml. of mobile phase. The peak of physiological activity appeared at about 1500 ml. The 700 to 2200 ml. fractions were pooled. The pooled fractions were concentrated to an aqueous phase, extracted with ether, and the ether extract evaporated to dryness. Two hundred and fifty mg. of this extract was put on a column of 45 g. of hydrophobic diatomite saturated with 40 ml. of stationary phase (isooctanol-chloroform, 1:1) and developed with 2200 ml. of mobile phase (47.5 percent aqueous methanol). The peaks of activity as determined by the microtitration and physiological activity appeared at about 910 ml., 1430 ml. and 1840 ml. In this and other examples the mobile and stationary phase are equilibrated before use as previously described.

PGE was isolated from the 1840 peak fraction, bisdehydro-PGE from the 1430 peak fraction, and tetradehydro PGE from the 910 peak fraction. The peak fractions were concentrated to aqueous, and extracted with ether. The new compounds bisdehydro-PGE and tetradehydro-PGE were shown to be essentially pure compounds by mass spectographic analysis. Also, on partition (not reverse phase) chromatography using an ethylene chloride: heptane: acetic acid: water (15:15:6:4) solvent system, substantially ideal curves, that is curves typical of the essentially pure compound, are obtained.

EXAMPLE 5

The procedure of Example 1A was repeated and the crude extract thus obtained was then partitioned on a partition column using 50 percent aqueous methanol as the mobile phase and a 50–50 mixture of isooctanol and chloroform as the stationary phase. The support was finely-divided, low-temperature polyethylene. Six grams of the crude extract was then put on the column with 67 ml. of stationary phase on 100 g. of the support. The column was then developed with 2200 ml. of mobile phase. The peak of physiological activity appeared at about 1500 ml. The 700 to 2200 ml. fractions were pooled. The pooled fractions were concentrated to an aqueous phase, extracted with ether, and the ether extract evaporated to dryness. Two hundred and fifty mg. of this extract was put on a column of 45 g. of hydrophobic diatomite saturated with 40 ml. of stationary phase (isoamylacetate, 1:1) and developed with 2200 ml. of mobile phase (35 percent aqueous methanol). The peak activity as determined by the microtitration and physiological activity appeared in the 400 to 480 ml. fractions with a peak at about 440 ml. After treating the active fraction to crystallize PGE using ethylacetate as the crystallizing solvent with intervening chromatography on those fractions where crystals could not readily be obtained, the mother liquors were evaporated to dryness and fractionated by reverse phase, partition chromatography by the procedure of the second stage of Example 4 to yield essential pure bisdehydro- and tetradehydro-PGE.

EXAMPLE 6

Following the procedure of Example 2, the methyl esters of bisdehydro-PGE and tetradehydro-PGE were obtained. The mass spectrographic analysis of these two esters as compared with that of PGE methyl ester is shown in the following table:

Peaks in the mass spectra of the methyl esters of:

|  | PGE | Bisdehydro-PGE | Tetradehydro-PGE |
|---|---|---|---|
| (1) M | (368) | (366) | (364) |
| (2) M−18 | 350 | 348 | 346 |
| (3) M−2×18 | 332 | 330 | 328 |
| (2) −31 | 319 | 317 | 315 |
| (3) −31 | 301 | 299 | 297 |
| (2) −71 | 279 | 277 |  |
| (3) −71 | 261 | 259 |  |
| (2) −69 |  |  | 277 |
| (3) −69 |  |  | 259 |
| (2) −143+1 |  |  |  |
| (3) −143+1 |  | 190 |  |
| (2) −141+1 |  |  |  |
| (3) −141+1 |  | 192 | 190 | 188 |

EXAMPLE 7

Reduction of PGE with sodium borohydride

A solution of 100 mg. of PGE dissolved in 10 ml. of methanol was cooled in an ice bath. A chilled solution of 300 mg. of sodium borohydride in 35 ml. of methanol was added. After 20 minutes at 0° C. the mixture was left at room temperature for one hour, Water was added and most of the methanol was taken off in vacuo. After acidification with hydrochloric acid the aqueous phase was extracted three times with ether, and the combined ether extracts was washed with water and brought to dryness at room temperature. The residue was subjected to reverse phase, partition chromatography on hydrophobic kieselguhr using 43 percent aqueous methanol as the mobile phase and equal parts of isooctanol chloroform as the stationary phase. The dried ether extract was placed on the column with 16 ml. of the stationary phase and developed with 1200 ml. of mobile phase. The 475– 650 ml. fractions were combined and taken to dryness and crystallized from ethyl acetate-pentane. The yield was 37 mg. of PGF M.P. 101° C. The 300–425 ml. fractions were processed in a like manner and crystallized from ethyl acetate-pentane to yield 47 mg. of crystalline epi-PGF having a melting point of 128° C. The interplanar spacings in angstrom units obtained by X-ray diffraction of crystalline PGF and epi-PGF prepared according to this example are given in the following table:

| PGF | | Epi-PGF | |
|---|---|---|---|
| d. A. | I | d. A. | I |
| 16.43 | s | 10.79 | vw |
| 9.49 | vw | 9.15 | vw |
| 8.22 | vw | 8.41 | w |
| 6.19 | w | 7.22 | m |
| 5.45 | w | 5.64 | m |
| 5.06 | w(d) | 4.78 | vw |
| 4.73 | w | 4.66 | vw |
| 4.62 | s(d) | 4.53 | s |
| 4.53 | w | 4.37 | s |
| 4.45 | m(vd) | 4.27 | w |
| 4.09 | m(d) | 4.17 | m |
| 4.02 | m(d) | 3.89 | m |
| 3.75 | w | 3.77 | m |
| 3.56 | vw | 3.64 | vw |
| 3.45 | vw(d) | 3.58 | vw |
| 3.07 | w(vd) | 3.51 | vw |
| 2.95 | w(vd) | 3.42 | vw |
| 2.67 | vw(vd) | 3.38 | vw |
| 2.58 | w(vd) | 3.34 | vw |
| 2.49 | w(d) | 3.12 | vm(vd) |
| 2.39 | vw(vd) | 3.03 | vw |
| 2.35 | vw(vd) | 2.96 | vw |
| 2.25 | vw(vd) | 2.92 | vw |
| 2.17 | vw(d) | 2.83 | vw |
| 2.02 | vw(vd) | 2.70 | vw(d) |
| 1.89 | vw(vd) | 2.60 | w(d) |
| 1.70 | vw(vd) | 2.46 | vw(d) |
|  |  | 2.40 | vw |
|  |  | 2.35 | vw |
|  |  | 2.32 | vw |
|  |  | 2.25 | m |
|  |  | 2.08 | vw |
|  |  | 2.00 | vw(vd) |
|  |  | 1.69 | vw(vd) |

NOTE.—s=strong, m=medium, w=weak, vw=very weak, d=diffuse vd=very diffuse.

EXAMPLE 8

Following the procedure of Example 7, substituting the PGE with bisdehydro-PGE there are obtained essentially pure bisdehydro-PGF and bisdehydro-epi-PGF. These preparations are sufficiently pure to give substantially ideal curves on partition chromatography by the procedure of Example 4.

EXAMPLE 9

Following the procedure of Example 7, substituting the PGE by tetradehydro-PGE, there are obtained essentially pure tetradehydro-PGF, and tetradehydro-epi-PGF. These preparations are sufficiently pure to give substantially ideal curves on partition chromatography by the procedure of Example 4.

Paper chromatographic mobilities relative to PGE on descending paper chromatography with ethylene chloride-heptane (1:1) as moving phase and 70 percent acetic acid as stationary phase are given in the following table:

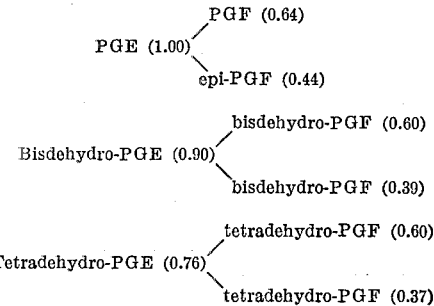

EXAMPLE 10

Following the procedure of Example 2 substituting the PGE by bisdehydro-PGF, bisdehydro-epi-PGF, tetradehydro-PGF, and tetradehydro-epi-PGF, there are obtained the methyl esters of bisdehydro-PGF, bisdehydro-epi-PGF, tetradehydro-PGF, and tetradehydro-epi-PGF. On reacting these esters with acetic anhydrides in pyridine solution, there were obtained methyl bisdehydro-PGF triacetate, methyl bisdehydro-epi-PGF triacetate, methyl tetradehydro-PGF triacetate, and methyl tetradehydro-epi-PGF triacetate. The retention time of these different esters relative to the corresponding ester of epi-PGF is shown in the following table:

| PGF type compound | Methyl ester | Methyl ester triacetate |
| --- | --- | --- |
| PGF | 1.11 | 1.14 |
| Epi-PGF | 1.00 | 1.00 |
| Bisdehydro-PGF | 0.91 | 0.99 |
| Bisdehydro-epi-PGF | 0.89 | 0.85 |
| Tetradehydro-PGF | 0.91 | 0.96 |
| Tetradehydro-epi-PGF | 0.86 | 0.86 |

Conditions: Flash heater—220° C.; column temperature 200° C.; column pressure 1.0 kg./cm.$^2$; column 6 ft. x 5 mm. packed with 0.5% QF–1 (Dow Corning Corp.) on Gas Chrom P (Applied Science Laboratory Inc.), as described by VandenHeuvel, Haahti and Horning (J. Am. Chem. Soc. 83, 1513 (1961).

EXAMPLE 11

Catalytic reduction of PGE

An active platinum catalyst was prepared by suspending 0.2 mg. of PtO$_2$ in 1.0 ml. of ethanol containing 10 percent by volume of acetic acid and reducing with hydrogen at near atmospheric pressure and about room temperature. After pre-reduction of the catalyst, 1 mg. of PGE is added and the hydrogenation continued until essentially one equivalent of hydrogen is absorbed. The catalyst is removed by centrifugation and washed thoroughly with ethanol. The combined organic solvents are evaporated under reduced pressure below 50° C. to afford a residue of dihydro-PGE. This material is further purified, if desired, by paper chromatography using acetic acid-water (70:30) as stationary phase and ethylene chloride-heptane (1:1) as mobile phase as described for PGE in Acta Chem. Scand. 14, 1693 (1960). (For larger samples the reverse phase, partition chromatography using hydrophobic diatomite as described above, can be used.) The purified dihydro-PGE is located as a single main spot free of U.V. absorption by phosphomolybdic acid spray. Material appearing at a similar spot in unsprayed sheets is eluted with ethanol to give essentially pure dihydro-PGE. If desired, crystals are obtained by crystallization from ether-petroleum ether or ethyl acetate-Skellysolve B (technical hexane).

Similarly, dihydro-PGE is obtained from bisdehydro-PGE and tetradehydro-PGE on allowing two and three equivalents of hydrogen, respectively, to be absorbed.

Following the procedure of the above example substituting the PGE and epi-PGF, there are obtained dihydro-PGF and dihydro-epi-PGF. Similarly using bisdehydro-PGF, bisdehydro-epi-PGF, tetradehydro-PGF and tetradehydro-epi-PGF, allowing 2 and 3 equivalents of hydrogen, respectively, to be absorbed, there are produced dihydro-PGF and dihydro-epi-PGF.

EXAMPLE 12

Following the procedure of Example 2, substituting the PGE by dihydro-PGE and dihydro-PGF, there was obtained the methyl esters of dihydro-PGE and dihydro-PGF and dihydro-epi-PGF.

In place of diazomethane in Examples 2, 3, 6, 10, and 12 other diazoalkanes, for example, diazoethane, 1-diazo-2-ethyl-hexane, cyclohexyldiazomethane, phenyldiazomethane, diphenyldiazo-methane, and the like, can be used to form the ethyl, the 2-ethyl-hexyl, the cyclohexylmethyl, the benzyl, the benzhydryl and like esters of dihydro-PGE, dihydro-PGF, dihydro-epi-PGF, bisdehydro-PGE, bisdehydro-PGF, bisdehydro-epi-PGF, tetradehydro-PGE, tetradehydro-PGF, and tetradehydro-epi-PGF. Other methods can also be used for preparing the same esters. For example, the silver salts of the acids can be reacted with the appropriate iodide, for example, methyl, ethyl, 2-ethyl-hexyl cyclohexyl, benzyl, or benzhydryl iodide. The esters of dihydro-PGE, dihydro-PGF, and dihydro-epi-PGF can also be prepared by hydrogenating the esters of the unsaturated acids.

By acetylating the above esters of PGE, PGF, epi-PGF, bisdehydro-PGE, bisdehydro-PGF, bisdehydro-epi-PGF, tetradehydro-PGE, tetradehydro-PGF, and tetradehydro-epi-PGF with acetic anhydride in pyridine, there are obtained the corresponding acetates. By substituting the acetic anhydride by the acid halides or acid anhydrides of propionic acid, butyric acid, isobutyric, valeric acid, isovaleric acid, caproic acid, and capric acid, the corresponding acylates are obtained.

EXAMPLE 13

Lithium aluminum hydride reduction

To 1.2 mg. of lithium aluminum hydride in 10 ml. of absolute ether there is added a solution of 3.6 mg. of bisdehydro-PGF in 1 ml. of redistilled dry tetrahydrofuran. After the mixture is stirred for 2 hours at room temperature, the excess lithium aluminum hydride is decomposed by addition of 0.5 ml. of 4 percent aqueous ammonium chloride. The mixture is filtered and the layers are separated. The aqueous layer is washed three times with 2 ml. each of ether. The combined organic phases are washed once with 2 ml. of saturated sodium chloride solution, dried over sodium sulfate, and evaporated to give a residue of bisdehydro-PGF tetraol {7-[3α,5α - dihydroxy-2 - (3-hydroxy-1-octenyl)-cyclopentyl]-5-hepten-1-ol}. If desired, this residue may be further purified by vapor phase chromatography, partition chromatography, and crystallization from ether-hexane to give the substantially pure material.

To 1 mg. of the above tetraol in 0.1 ml. of pyridine is added 0.1 ml. of acetic anhydride. The solution is kept under nitrogen for 4 hours at room temperature, is diluted with water, and after ½ hour, extracted with ether. The ether solution is washed successively with water, dil. hydrochloric acid, dil. sodium bicarbonate, water, and dried over anhydrous sodium sulfate. The solution is evaporated to give a residue of the tetraacetate of bisdehydro PGF tetraol.

By substituting the bisdehydro-PGF by PGF, epi-PGF, dihydro-PGF, dihydro-epi-PGF, tetra-dehydro-PGF, and tetradehydro-epi-PGF, there are obtained PGF tetraol, epi-PGF tetraol, dihydro-PGF tetraol, dihydro-epi-tetraol, bisdehydro - epi-PGF tetraol, tetradehydro-PGF tetraol and tetradehydro-epi-tetraol. On reacting these tetraols with acetic anhydride by the procedure given above the corresponding tetraacetates are obtained. By substituting the acetic anhydride by the acid anhydrides or acid halides of propionic acid, butyric acid, isobutyric acid, valeric acid, isovaleric acid, caproic acid, and capric acid, the corresponding tetralower-alkanoates are obtained.

PGE type compounds can be substituted for the PGF type compounds in the lithium aluminum hydride reduction and the α and the β-epimers obtained can be separated by the procedure of Example 7.

EXAMPLE 14

The procedure of Example 4 was repeated using sheep lungs instead of sheep prostate glands. The active peak in the last partition column was obtained at about 850 mls. On evaporating the peak fractions to dryness, there was obtained essentially pure bisdehydro-PGF. When pig lungs were substituted for sheep lungs, the same compound was obtained. Mass spectrographic analysis showed that the compounds were essentially pure and comparison of the methyl ester, the acetylated methyl ester, and the tetraacetate of the tetraol prepared by the procedure given above with the corresponding derivative of the bisdehydro-PGF obtained by borohydride reduction of bisdehydro-PGE, established identity.

We claim:
1. 7 - [3-hydroxy-2-(3-hydroxy-1-octenyl)-5-oxocyclopentyl]-5-heptenoic acid, said acid being sufficiently pure to give a substantially ideal curve on partition chromatography using an ethylene chloride:heptane:acetic acid:water (15:15:6:4) solvent system.
2. A composition of matter consisting essentially of 7-[3 - hydroxy - 2-(3-hydroxy-1,5-octadienyl)-5-oxocyclopentyl]-5-heptenoic acid.

References Cited

UNITED STATES PATENTS

| 2,683,721 | 7/1954 | Schlesinger et al. | 260—514 |
| 2,819,299 | 1/1958 | Teeter et al. | 260—514 |
| 3,069,322 | 12/1962 | Bergstrom et al. | 167—74 |

OTHER REFERENCES

Bergstrom et al.; Acta Chemica Scandinavia, vol. 14, pt. 2 (1960), pp. 1693–1710.

CHARLES B. PARKER, Primary Examiner

R. GERST, Assistant Examiner

U.S. Cl. X.R.

260—211R, 247.2R, 247.2B, 268R, 294D, 294.3R, 326.3, 472, 476R, 488R, 501.15, 501.17, 514R; 424—317

UNITED STATES PATENT OFFICE
CERTIFICATE OF CORRECTION

Patent No. 3,598,858　　　　　　　　Dated August 10, 1971

Inventor(s) Sune Bergstrom and Jan Sjövall

It is certified that error appears in the above-identified patent and that said Letters Patent are hereby corrected as shown below:

Column 1, line 50, for "84,210" read -- 84, 21 --. Column 2, line 38, for "ep-PGF" read -- epi-PGF --. Column 4, line 7 for "octadientyl" read -- octadienyl --; lines 13-14 for "acrylating" read -- acylating --. Column 5, line 71, for "mu " read -- m$\mu$ --. Column 8, table heading, for "Pr phase" read -- Per phase --; line 74, for "1114,995" read -- 1124,995 --. Column 9, line 62, for "13,00" read -- 13.00 --. Column 13, line 61, for "PGE and epi-PGF" read -- PGE by PGF and epi-PGF --. Column 14, line 54, for "dihydro-epi-PGF, tetradehydro-PGF, and" read -- dihydro-epi-PGF, bisdehydro-epi-PGF, tetra-dehydro-PGF, and --.

Signed and sealed this 27th day of June 1972.

(SEAL)
Attest:

EDWARD M. FLETCHER, JR.　　　　　ROBERT GOTTSCHALK
Attesting Officer　　　　　　　　　Commissioner of Patents